UNITED STATES PATENT OFFICE.

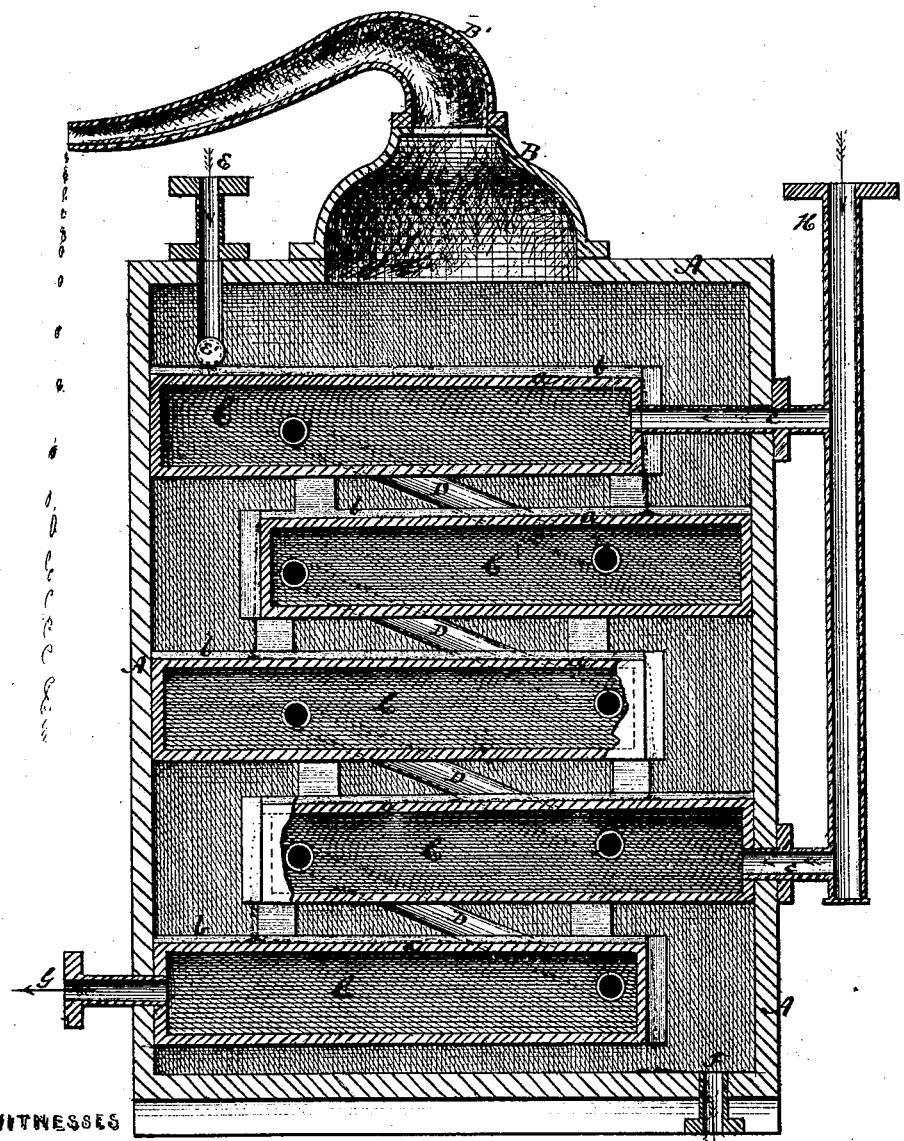

HENRY A. STEARNS, OF SMITHFIELD, RHODE ISLAND.

IMPROVEMENT IN APPARATUS FOR DISTILLING HYDROCARBONS.

Specification forming part of Letters Patent No. 103,385, dated May 24, 1870.

*To all whom it may concern:*

Be it known that I, HENRY A. STEARNS, of Smithfield, in the county of Providence and State of Rhode Island, have invented a new and useful Improvement in Stills for Hydrocarbons and other purposes; and I do hereby declare that the following specification, taken in connection with the drawings making a part of the same, is a full, clear, and exact description thereof.

The apparatus hereinafter described is specially intended to be employed in the separation of oils from the light hydrocarbons, by the aid of which such oils have been extracted from animal and vegetable substances.

It has long been known to science that the light hydrocarbons obtained from coal-oil, shale-oil, and petroleum, though differing from each other in the proportions of their constituents of hydrogen and carbon, are all distinguished for a common property of dissolving animal and vegetable oils. Accordingly, this agent has for a long time been used in the laboratory for extracting essential oils from seeds and other vegetable products, and in the arts for the cleaning of machinery-waste.

In order, however, to make this process of extracting oils practically useful and capable of being economically employed upon any considerable scale in the arts, it is indispensable to provide a means for recovering separately the oil and the hydrocarbon solvent from the mixed solution which results from treating vegetable or animal material containing oil with a hydrocarbon solvent.

Hitherto a worm-still has been used for this purpose; but this apparatus has been found to be insufficient to effect a thorough separation of the hydrocarbon solvent from the oil.

My invention resides in an apparatus which employs heated plates or evaporators within a chamber, over which plates the mixed solution is spread out and made to flow in a thin film, the heat of the plates causing the volatile hydrocarbon to be driven off from the oil by evaporation in the form of vapor, in which state it is readily collected and condensed, while the oil is run off separately.

In the accompanying drawing, which is a longitudinal and vertical section of the apparatus, A represents the walls of a close retort or chamber, surmounted by a dome, B, with a retort-neck, B'. C indicates hollow plates or evaporators, which are arranged one above another in a series, and may be as numerous as is considered necessary. The top plates, $a$, of each of these hollow evaporators are slightly inclined, so that a fluid poured upon the uppermost plate will flow with a gentle current from the first to the last evaporator over each one of the series in succession. Suitable elevated side-boards $b$ prevent the fluid from flowing over the sides of the evaporators and guide it toward the edge of the evaporator, over which it is to fall upon the top surface of the next in order.

H is a steam-pipe, with lateral branches $c$, communicating with the interior of as many of the evaporators as may be preferred, to maintain a uniform heat throughout the series; and the several evaporators are connected by pipes D, set at an angle, or otherwise arranged, to bring all the evaporators into complete communication, and allow any condensed steam to flow away.

The mixture to be separated is supposed to be contained in a vessel which, by means of the pipe E, is in communication with the apparatus.

A convenient way to spread it over the surface of the upper evaporator will be to allow it to flow in fine jets through perforations in a transverse pipe, E', set at right angles with the pipe E, and a cock may be placed in the pipe E to regulate the quantity of flow.

It will be readily understood from the foregoing that the mixture of oil and hydrocarbon solvent will flow in a thin sheet over the top plate of the upper evaporator, and in its course will part with the most volatile of its constituents. Passing to the second and other evaporators in the series, it will flow over the same in a similar manner until, by the time the fluid has reached the exit-pipe F, it will have lost all the hydrocarbon solvent which it contained. The volatile matters so expelled rise in the form of vapor, and the space between the evaporators should be sufficient to afford no hinderance to their free disengagement. These vapors pass off through the pipe B', and are readily condensed and collected in well-known ways. The oil and heavier non-volatile matters are drawn off through the pipe F, which, as well as the outlet-pipe G of the evaporators, should be properly tapped.

What I claim as my invention, and desire to secure by Letters Patent, is—

The improved distillery apparatus consisting of the chamber A, with suitable inlets and outlets, and provided with a series of alternating hollow flat-surfaced evaporators, C, the interiors of which are connected, and so arranged that a current of steam may be forced from one to the other throughout the series, substantially as shown and described.

HENRY A. STEARNS.

Witnesses:
 EDWARD C. AMES,
 ORVILLE PECKHAM.